United States Patent
Danilov et al.

(10) Patent No.: US 11,360,992 B2
(45) Date of Patent: Jun. 14, 2022

(54) WATERMARKING OF EVENTS OF AN ORDERED EVENT STREAM

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 11 days.

(21) Appl. No.: 16/915,762

(22) Filed: Jun. 29, 2020

(65) Prior Publication Data

US 2021/0406273 A1 Dec. 30, 2021

(51) Int. Cl.
*G06F 16/00* (2019.01)
*G06F 16/25* (2019.01)
(Continued)

(52) U.S. Cl.
CPC .......... *G06F 16/25* (2019.01); *G06F 16/2365* (2019.01); *G11B 20/00905* (2013.01)

(58) Field of Classification Search
CPC .......... G06F 16/152; G06F 9/50; G06F 16/13; G06F 16/134; G06F 16/14; G06F 16/1805; G06F 16/2255; G06F 16/278; G06F 16/325; G06F 16/9014; G06F 17/30091; G06F 17/30094; G06F 17/301; G06F 17/30106; G06F 17/3012; G06F 17/30185;
(Continued)

(56) References Cited

U.S. PATENT DOCUMENTS 3,617,587 A 11/1971 Nayar et al.
5,826,977 A 10/1998 Fowler et al.
(Continued)

FOREIGN PATENT DOCUMENTS

CA 2672879 4/2008
CN 1708029 12/2005
(Continued)

OTHER PUBLICATIONS

Office Action dated Jan. 29, 2021 for U.S. Appl. No. 16/256,083, 42 pages.
(Continued)

*Primary Examiner* — Shyue Jiunn Hwa
(74) *Attorney, Agent, or Firm* — Amin, Turocy & Watson, LLP

(57) ABSTRACT

Watermarking of an ordered event stream (OES) is disclosed. Writing events to an OES can advance populating of the OES, which can be correspond to progress values. Progress values can enable a reader to know where it is in an OES. A reported progress value can be determined from the progress values based on an event being committed to the OES. Moreover, an effective progress value can be determined from the progress values and monitoring the OES for events with that defer being committed to the OES. A watermark for the OES can be determined from the effective progress value such that reading beyond the effective progress value is restricted. This can provide confidence that the reader has read out properly committed events and has not omitted any events having deferred commitment.

20 Claims, 10 Drawing Sheets

(51) Int. Cl.
*G06F 16/23* (2019.01)
*G11B 20/00* (2006.01)

(58) Field of Classification Search
CPC ........... G06F 17/3033; G06F 17/30584; G06F 17/30628; G06F 17/30949; G06F 3/06; G06F 3/0659; G06F 3/067; G06F 16/2358; G06F 16/2379; G06F 9/542; G06F 16/24568; G06F 3/0604; G06F 3/0689; G06F 3/0679; G06F 15/8053; G06F 15/8092; G06F 16/2322; G06F 16/2477; G06F 3/0611; G06F 3/0653; G06F 7/36; G06F 11/3006; G06F 11/302; G06F 17/18; G06F 11/14; G06F 16/182; G06F 16/20; G06F 16/27

See application file for complete search history.

(56) References Cited

U.S. PATENT DOCUMENTS

| | | | |
|---|---|---|---|
| 8,572,091 | B1 | 10/2013 | Sivasubramanian et al. |
| 8,655,825 | B2 | 2/2014 | Roesch et al. |
| 8,825,848 | B1 | 9/2014 | Dotan et al. |
| 9,514,018 | B2 | 12/2016 | Sikri |
| 9,639,589 | B1 | 5/2017 | Theimer |
| 9,753,932 | B1 | 9/2017 | Brow et al. |
| 9,898,482 | B1 | 2/2018 | Bono |
| 9,965,215 | B1 | 5/2018 | Vazhenin et al. |
| 10,565,208 | B2 | 2/2020 | Thou, Jr. et al. |
| 10,860,457 | B1 | 12/2020 | Evenson |
| 10,867,033 | B2 | 12/2020 | Keren et al. |
| 11,016,826 | B2 | 5/2021 | Lehmann |
| 11,194,638 | B1 | 12/2021 | Danilov et al. |
| 2004/0199524 | A1 | 10/2004 | Rys et al. |
| 2005/0055519 | A1 | 3/2005 | Stuart et al. |
| 2007/0220518 | A1 | 9/2007 | Verbowski et al. |
| 2008/0184262 | A1 | 7/2008 | Ginis et al. |
| 2008/0301135 | A1* | 12/2008 | Alves .................. G06F 16/2453 |
| 2009/0182784 | A1 | 7/2009 | Rohit et al. |
| 2010/0083098 | A1 | 4/2010 | Leme et al. |
| 2010/0125794 | A1 | 5/2010 | Hampton et al. |
| 2011/0126099 | A1 | 5/2011 | Anderson et al. |
| 2011/0131588 | A1 | 6/2011 | Allam et al. |
| 2011/0249147 | A1 | 10/2011 | Ishii |
| 2012/0102503 | A1 | 4/2012 | Meijer et al. |
| 2012/0109985 | A1 | 5/2012 | Chandrasekaran |
| 2013/0226931 | A1 | 8/2013 | Hazel et al. |
| 2013/0275808 | A1 | 10/2013 | McNeeney et al. |
| 2014/0089264 | A1 | 3/2014 | Talagala et al. |
| 2014/0223115 | A1 | 8/2014 | Dinkjian et al. |
| 2015/0169449 | A1 | 6/2015 | Barrell et al. |
| 2015/0172120 | A1 | 6/2015 | Dwarampudi et al. |
| 2015/0341212 | A1 | 11/2015 | Hsiao et al. |
| 2015/0363245 | A1 | 12/2015 | Mutschler |
| 2016/0063080 | A1 | 3/2016 | Nano et al. |
| 2016/0210061 | A1 | 7/2016 | Soncodi et al. |
| 2016/0321287 | A1 | 11/2016 | Luthra et al. |
| 2016/0337435 | A1 | 11/2016 | Nigam et al. |
| 2016/0357476 | A1 | 12/2016 | Chen et al. |
| 2017/0075832 | A1 | 3/2017 | Bhimani et al. |
| 2017/0075947 | A1 | 3/2017 | Kurilov et al. |
| 2017/0177263 | A1 | 6/2017 | Das et al. |
| 2017/0212891 | A1 | 7/2017 | Pundir et al. |
| 2018/0101842 | A1 | 4/2018 | Ventura et al. |
| 2018/0121307 | A1 | 5/2018 | Braun et al. |
| 2018/0176244 | A1 | 6/2018 | Gervais et al. |
| 2018/0184138 | A1* | 6/2018 | Shaw .................. H04N 21/242 |
| 2018/0329644 | A1 | 11/2018 | Das et al. |
| 2018/0332325 | A1 | 11/2018 | Kaitchuck |
| 2018/0332365 | A1 | 11/2018 | Kaitchuck et al. |
| 2018/0332366 | A1 | 11/2018 | Paduroiu |
| 2018/0332367 | A1 | 11/2018 | Kaitchuck et al. |
| 2018/0336256 | A1 | 11/2018 | Li et al. |
| 2018/0345140 | A1 | 12/2018 | Posin |
| 2019/0026301 | A1 | 1/2019 | Wang et al. |
| 2019/0138494 | A1 | 5/2019 | Inoue |
| 2019/0340180 | A1 | 11/2019 | Barsness et al. |
| 2019/0349422 | A1 | 11/2019 | Dhruvakumar et al. |
| 2020/0034468 | A1* | 1/2020 | Lei .......................... G06F 17/18 |
| 2020/0174695 | A1 | 6/2020 | Bazarsky et al. |
| 2020/0250172 | A1 | 8/2020 | Busjaeger et al. |
| 2020/0320005 | A1 | 10/2020 | Shulman et al. |
| 2020/0344299 | A1 | 10/2020 | Sohail et al. |
| 2020/0394196 | A1 | 12/2020 | Shivanna et al. |
| 2020/0404011 | A1 | 12/2020 | Gervais et al. |
| 2021/0110328 | A1* | 4/2021 | Hsiao ..................... G06F 16/248 |
| 2021/0124746 | A1 | 4/2021 | Klaedtke |
| 2021/0256029 | A1 | 8/2021 | Danilov et al. |
| 2021/0342296 | A1 | 11/2021 | Danilov et al. |
| 2021/0342354 | A1 | 11/2021 | Danilov et al. |
| 2021/0365211 | A1 | 11/2021 | Danilov et al. |
| 2022/0035533 | A1 | 2/2022 | Danilov et al. |

FOREIGN PATENT DOCUMENTS

| | | |
|---|---|---|
| CN | 104901958 | 9/2015 |
| CN | 105591926 | 5/2016 |
| GB | 2377038 | 12/2002 |
| WO | 2002101585 | 12/2002 |
| WO | 2009014993 | 1/2009 |
| WO | 2015191120 | 12/2015 |
| WO | 2018148149 | 8/2018 |

OTHER PUBLICATIONS

Akidau et al., "MillWheel: Fault-Tolerant Stream Processing at Internet Scale" Proceedings of the VLDB Endowment, vol. 6, No. 11, 2013, 12 pages.

Akidau et al., "The Dataflow Model: A Practical Approach to Balancing Correctness, Latency, and Cost in Massive-Scale, Unbounded, Out-of-Order Data Processing" Proceedings of the VLDB Endowment, vol. 8, No. 12, 2015, 12 pages.

"Execution Model" [https://beam.apache.org/documentation/runtime/model/]. The Apache Software Foundation. Retrieved Aug. 26, 2020, 5 pages.

"Apache Beam Programming Guide" [https://beam.apache.org/documentation/programming-guide/]. The Apache Software Foundation. Retrieved Aug. 26, 2020, 69 pages.

"What is Apache Flink?—Applications" [https://flink.apache.org/flink-applications.html#building-blocks-for-streaming-applications]. The Apache Software Foundation. Copyright 2014-2019, retrieved Aug. 26, 2020, 7 pages.

"What is Apache Flink?—Architecture" [https://flink.apache.org/flink-architecture.html]. The Apache Software Foundation. Copyright 2014-2019, retrieved Aug. 26, 2020, 3 pages.

"Stateful Function—Event-driven Application on Apache Flink" [https://flink.apache.org/stateful-functions.html]. The Apache Software Foundation. Copyright 2014-2019, retrieved Aug. 26, 2020, 8 pages.

"What is Apache Flink?—Operations" [https://flink.apache.org/flink-operations.html]. The Apache Software Foundation. Copyright 2014-2019, retrieved Aug. 26, 2020, 3 pages.

"Use Cases" [https://flink.apache.org/usecases.html]. The Apache Software Foundation. Copyright 2014-2019, retrieved Aug. 26, 2020, 5 pages.

"Introduction" [http://kafka.apache.org/intro]. The Apache Software Foundation. Copyright 2017, retrieved Aug. 26, 2020, 6 pages.

"Apache Kafka Quickstart" [http://kafka.apache.org/quickstart]. The Apache Software Foundation. Copyright 2017, retrieved Aug. 26, 2020, 6 pages.

"Use Cases" [http://kafka.apache.org/uses]. The Apache Software Foundation. Retrieved Aug. 26, 2020, 3 pages.

"Architecture Overview" [pulsar.apache.org/docs/en/concepts-architecture-overview/]. The Apache Software Foundation. Copyright 2020, retrieved Aug. 26, 2020, 11 pages.

"Messaging" [pulsar.apache.org/docs/en/concepts-messaging/]. The Apache Software Foundation. Copyright 2020, retrieved Aug. 26, 2020, 32 pages.

(56) References Cited

OTHER PUBLICATIONS

"Pulsar Overview" [pulsar.apache.org/docs/en/concepts-overview/]. The Apache Software Foundation. Copyright 2020, retrieved Aug. 26, 2020, 2 pages.
Notice of Allowance dated Dec. 15, 2021 for U.S. Appl. No. 17/064,747, 54 pages.
Office Action dated Oct. 1, 2021 for U.S. Appl. No. 17/127,724, 41 pages.
Office Action dated Nov. 10, 2021 for U.S. Appl. No. 16/944,089, 75 pages.
Kleppmann, Martin. "Making Sense of Stream Processing—The Philosophy Behind Apache Kafka and Scalable Stream Data Platforms"; Mar. 4, 2016; retrieved from [https://hashingit.com/elements/research-resources/2016-03-04-making-sense-of-stream-processing.pdf] on Nov. 5, 2021, (Year: 2016), 183 pages.
Notice of Allowance dated Jun. 28, 2021 for U.S. Appl. No. 16/884,647, 39 pages.
Office Action dated Jun. 29, 2021 for U.S. Appl. No. 16/881,556, 24 pages.
Notice of Allowance dated Aug. 4, 2021 for U.S. Appl. No. 17/200,652, 51 pages.
Office Action dated Apr. 12, 2022 for U.S. Appl. No. 17/038,102, 48 pages.
Office Action dated Jan. 21, 2022 for U.S. Appl. No. 16/864,892, 26 pages.
Notice of Allowance dated Feb. 24, 2022 for U.S. Appl. No. 17/038,079, 55pgs.
Azhar et al., "Efficient selection of access control systems through multi criteria analytical hierarchy process", IEEE, doi: 10.1109/ICET.2012.6375419, 2012, pp. 1-8. (Year: 2012).
Rox et al., "Construction and Deconstruction of Hierarchical Event Streams with Multiple Hierarchical Layers", IEEE, doi: 10 1109/ECRTS.2008 13,2008, pp. 201-210. (Year: 2008).
Notice of Allowance dated Feb. 18, 2022 for U.S. Appl. No. 17/083,145, 70pgs.
Office Action dated Mar. 21, 2022 for U.S. Appl. No. 16/864,905, 125 pgs.
Edi Muskardin et al., " Implementation of Hashing Algorithms in Stream Mining", International Conference on Smart Systems and Technologies (SST), Oct. 2018 , pp. 233-238.
Notice of Allowance dated Apr. 11, 2022 for U.S. Appl. No. 16/944,089, 87 pages.
J. C. Lee, J. Vance and R. Lysecky, "Hardware-Based Event Stream Ordering for System-Level Observation Framework," in IEEE Embedded Systems Letters, vol. 6, No. 4, pp. 81-84, Dec. 2014, doi: 10.1109/LES.2014.2359154 (Year: 2014).
T. Onishi, J. Michaelis and Y. Kanemasa, "Recovery-Conscious Adaptive Watermark Generation for Time-Order Event Stream Processing," 2020 IEEE/ACM Fifth International Conference on Internet-of-Things Design and Implementation (IoTDI), 2020, pp. 66-78, doi: 10.1109/IoTDI49375.2020.00014. (Year: 2020).
Aloysius K. Mok, Honguk Woo and Chan-Gun Lee, "Probabilistic Timing Join over Uncertain Event Streams," 12th IEEE International Conference on Embedded and Real-Time Computing Systems and Applications (RTCSA'06), 2006, pp. 17-26, doi: 10.1109/RTCSA.2006.52. (Year: 2006).
M. Liu, M. Li, D. Golovnya, E. A. Rundensteiner and K. Claypool, "Sequence Pattern Query Processing over Out-of-Order Event Streams," 2009 IEEE 25th International Conference on Data Engineering, 2009, pp. 784-795, doi 10.1109/ICDE.2009.95. (Year: 2009).
Office Action dated Apr. 20, 2022 for U.S. Appl. No. 16/944,094, 48 pages.

* cited by examiner

WATERMARKING OF EVENTS OF AN ORDERED EVENT STREAM

TECHNICAL FIELD

The disclosed subject matter relates to data storage and, more particularly, to watermarking events of an event stream of a stream data storage system.

BACKGROUND

Conventional data storage techniques can timestamp events of an event stream to facilitate reading of events corresponding to a selected time parameter, e.g., events with a time stamp in a selected time window can be read from an event stream storage system. One use of data storage is in bulk data storage. Conventional timestamping of events of an event stream of a stream data storage system can result in erroneously reading events. Accordingly, employing techniques other than timestamp techniques, e.g., watermarking of events as disclosed herein below, can improve the stream data storage system by enabling the stream data storage system to avoid erroneously reading of events.

DETAILED DESCRIPTION

Figure 1:
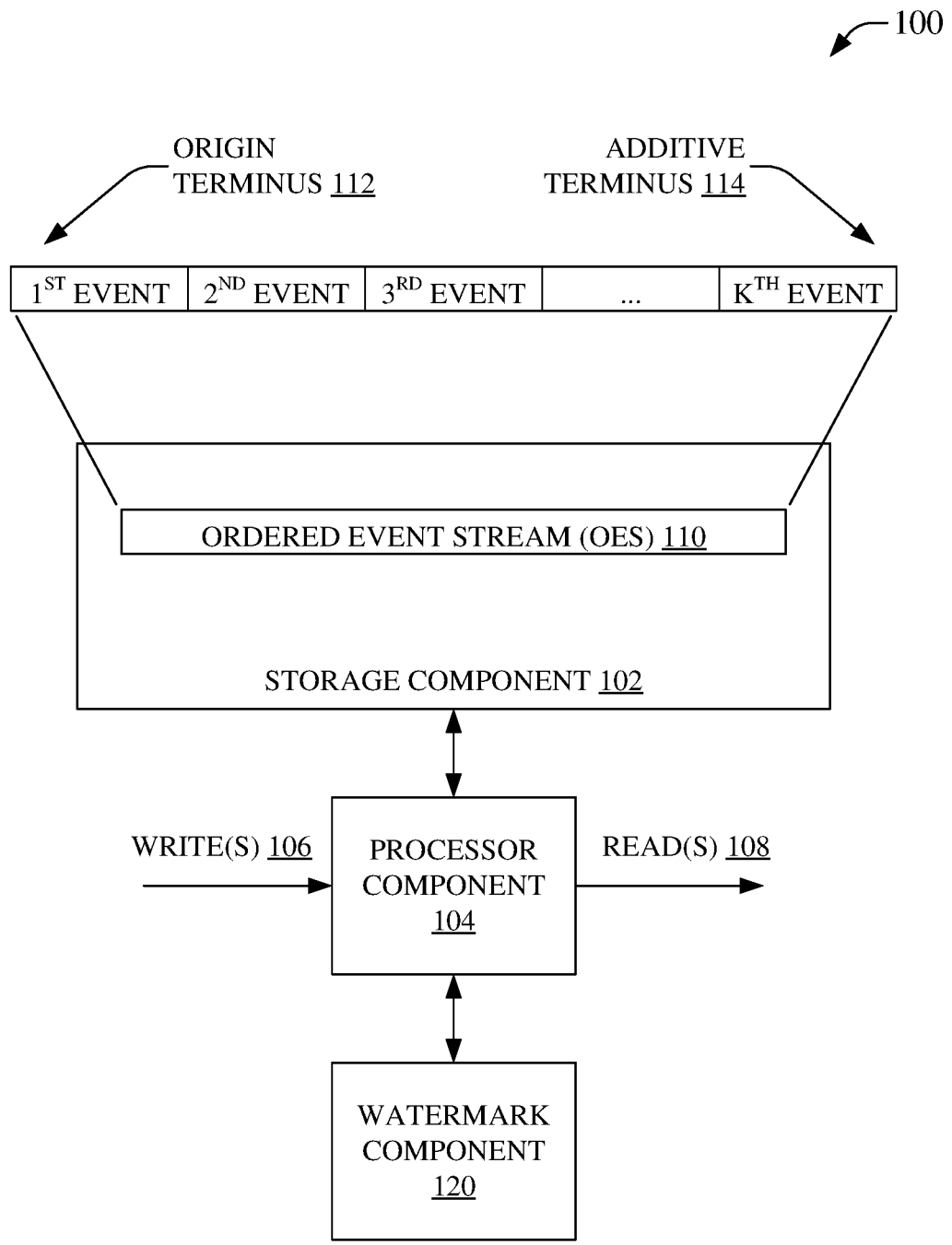
FIG. 1 is an illustration of an example system that can facilitate watermarking based on progress of OES event object storage via an ordered event stream, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

An event stream, or a stream for convenience, can be a durable, elastic, append-only, unbounded sequence of so-called events that can be stored via an ordered event stream (OES) system. An example of an ordered event streaming storage platform can be STREAMING DATA PLATFORM (SDP) by DELL EMC. An event can be added to a head of a stream of events, e.g., a first event can be considered at a tail of the event stream and a most recent event can be regarded as at the head of the stream with other events ordered between the tail and the head of the stream. Every event of the stream can have a routing key, or simply a key for convenience. A key can often be derived from data of the event, e.g., a "machine-id," "location," "device type," "customer number," "vehicle identifier," etc. As such, events with the same routing key can be consumed, e.g., read, in the order they were written. A read event can correspond to an indicated stream progress value, often a time value, such that one or more events satisfying a progress rule based on a progress value can be read via the OES system.

As mentioned, conventional event stream storage techniques, for example, can employ a timestamp to represent progress of writing OES events for an OES storage system. This can facilitate locating appropriate OES events for read operations, e.g., a read operation can indicate a time window to allow reading of events satisfying a rule related to the indicated time window. As an example, a read event can indicate that events up to a designated time be read. As such, timestamping can be a useful tool in OES systems to facilitate access to OES events of interest. An OES system can store OES events in a continuous and unbounded sequence. In an aspect, an OES storage system can add an event to a head of a stream such that the oldest event can be at the tail of the stream and the youngest event can be at the head of the stream. OES systems can further store multiple events for an OES at a same time and/or at different times, e.g., two events can be in the process of being written at the same time, at different times, or at overlapping times. As an example, a first event can consume two units of time to write and a second event can consume three units of time to write. In this example, where the two events can occur at time T, the first event can be written by T+2 and the second event can be written by T+3, such that from T to T+2, both events were being simultaneously written to corresponding storage locations of the OES system. Similarly, in the above example, where the first event can occur at time T and the second event can occur at T+3, the first event can be written by T+2 and the second event can be written by T+6, such that from T to T+2 the first event is written and form T+3 to T+6 the second event is written, e.g., the two events are not written simultaneously. Further, where the first event can occur at time T and the second event can occur at T+1, the first event can be written by T+2 and the second event can be written by T+4, such that from T to T+2 the first event is written and form T+1 to T+4 the second event is written, e.g., the two events are not written partially simultaneously having overlapping writing occurring from T+1 to T+2.

An OES reader, e.g., a device or operation executing on a device, can read written events from an OES stream. As an example, a reader can read an event written at a designated time. As another example, a reader can read multiple events written at a designated time. As a further example, a reader can read one or more events corresponding to a designated time window. As an example, a first event can consume two units of time to write and a second event can consume three units of time to write, and where the two events occurred at time T, such that the first event was written by T+2 and the second event was written by T+3, a reader instructed to return events before T+4 can return both the first and second OES events. However, in this example, readers of different OES schema can diverge in what they return in some situations. As an example, a first event can consume two units of time to write and a second event can consume three units of time to write, and where the two events occurred at time T, such that the first event was written by T+2 and the second event was written by T+3, a first OES scheme reader instructed to return events before T+2 can return only the first OES event because the second OES event has not completed writing. However, in this example, a second OES scheme reader also instructed to return events before T+2 can return both the first and second OES events because they were both being written at T+2, albeit that the second OES event hadn't yet been completely written until T+3. This difference between OES schema can present an issue of confidence in an OES system in that it can be uncertain if all proper OES events have been returned for a query sent to a reader unless the rules related to a given OES scheme are well known and understood. Accordingly, it can be desirable to define reader characteristics such that there can be confidence that appropriate OES events are being returned by a reader based on the parameters of the read query presented to a reader.

In an aspect, the disclosed subject matter can accommodate read operations with high confidence that OES events corresponding to query parameters are being returned by a reader. In an aspect, an OES system can write an event to an OES stream and the write can then be committed to the OES stream. As an example, a first event can consume two units of time to write and a second event can consume three units of time to write, and where the two events occurred at time T, the first event was written by T+2 and the second event was written by T+3. In this example, the first event can be committed at T+2, e.g., until time T+2, the first event can be uncommitted, and the second event can be committed at T+3, e.g., until time T+#the second event can be uncommitted. The disclosed subject matter can treat an uncommitted event as inappropriate for reading. In the current example, a request to read events before T+2 would generally not return the second event because it was not committed at T+2.

The disclosed subject matter treating an uncommitted event as inappropriate for reading can provide further benefit. In some embodiments, a transaction, where transaction is used as a noun, can comprise one or more events. As an example, a first transaction, Transaction_1, can comprise two events, t1e1 and t1e2. In an aspect, a transaction can be uncommitted over a period of progress, such as over a time period. Further, it is explicitly noted that in the presently disclosed subject matter, progress can be employed as being able to representing advancement of an OES stream by metrics other than time. Examples of progress can comprise an event count, time, distance, etc., however, where time is typically an easy metric to comprehend, progress as is discussed in this specification is generally recited as time based although it is expressly not so limited. In an aspect, a transaction, such as Transaction_1 from the above example, can begin, for example, at T+3 and be in an uncommitted state. In this example, event t1e1 can be written from T+4 to T+5 and event t1e2 can be written from T+7 to T+9. Moreover, in this example, Transaction_1 can be closed at T+15, such that Transaction_1 can be uncommitted until T+15. It is noted that in this example, both t1e1 and t1e2 are fully written well before Transaction_1 is committed at T+15. It is further noted that an OES system, as disclosed herein, that events can be associated with a progress value, a reported progress value, and/or an effective progress value. In an aspect, an event can have a progress value that can be the same or different from a reported progress value, which can be the same or different from an effective progress value. In an aspect, an event can inherit a commitment state of a parent transaction, e.g., events of a transaction can be uncommitted while the transaction is uncommitted. In the above example, t1e1, written by T+5, and t1e2, written by T+9, can be uncommitted until T+15. As such, in the above example, t1e1 can have a progress state at T+4, e.g., writing 'started,' a progress state at T+5, e.g., writing 'ended,' and a progress state at T+15, e.g., event 'committed.' Similarly, t1e1 can have a reported progress state at T+5, e.g., writing 'ended,' and a reported progress state at T+15, e.g., event 'committed.' Further, t1e1 can have an effective progress state at T+15, e.g., event 'committed.' In regards to the OES system, reading out t1e1 can occur for a read query parameter indicating an effective progress of T+15 or greater. Moreover, a read query indicating a reported progress of T+5 or greater can return t1e1. Further, a read query indicating a progress of T+4 or greater can return t1e1.

The use of an effective progress indication can be of benefit where a transaction may not necessarily be committed. As an example, in a ride sharing application, a transaction can be opened in response to a customer requesting transportation. The transaction can remain open to allow associated events to be written within the transaction, for example, an event assigning a driver to pick up the customer, an event indicating the route taken during the ride, an even indicating completion of the ride, an event indicating payment, an event indicating the customer providing a gratuity for the driver at a time later than the payment, an event indicating a customer entering a review of the ride, etc. The example transaction can be committed, for example after one or more of the above example events are written to the OES system. A read operation indicating a time after the commitment of the example transaction can then be expected to return the events of that transaction. However, the example transaction can also be discarded without being committed, for example, the transaction can be opened, an event can be written for assigning a driver, and then the customer can cancel the requested ride, which can result in deletion of the transaction without being committed. In the uncommitted transaction, the assignment of the driver event can have been completely written and, accordingly, in typical conventional streaming systems, a read request after the event is written but before the cancelation of the ride can return the assignment of the driver event data. In contrast, the presently disclosed subject matter can employ an effective progress value that treats the assignment of the driver event as uncommitted until the enclosing transaction is committed, and therefore would generally not return the assignment of the driver event data because the transaction was not committed. In an aspect, the presently disclosed subject matter can be instructed to return events based on a returned progress parameter and/or a progress parameter, as contrasted with an effective progress parameter, which could result in return of the event even where the transaction may yet be in an uncommitted state. However, it can be appreciated that the use of the returned progress and/or progress parameter can actually return event data that can later be 'ignored' where the transaction is never actually committed. As such, determining and employing an effective progress metric can provide value in an OES system by avoiding reading of events that are not regarded as fully committed to the OES. Watermarking can comprise storing an effective progress value, a reported progress value, and/or a progress value for an OES event.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate watermarking based on progress of OES event object storage via an ordered event stream, in accordance with aspects of the subject disclosure. System 100 can comprise a storage component 102 that can store an ordered event stream (OES) 110. OES 110 can store one or more events. An event can be associated with a key, e.g., a routing key. A key can typically be determined from aspects of the corresponding event, although other key determination techniques can be employed. As an example, a key can be based on a characteristic of the source of the event data, such as a customer identifier, machine identifier, a location of a device providing the event data, a type of a device providing the event data, etc. Events with a same key can be written into OES 110 in an ordered manner, e.g., according to a progress metric. Similarly, events with a same key can be read from OES 110 in an ordered manner, e.g., according to a progress metric associated with the order in which they were previously written into OES 110. Components providing events to be written can be termed 'writers' and components requesting events can be termed 'readers'. As such, a writer can provide an event that can be written to OES 110 in an ordered manner based on a key and/or a progress value associated with the event. Similarly, a reader can receive an event from OES 110 based on a key and/or a progress value.

Processor component 104 of a system 100 can receive write(s) 106 that can be written to OES 110 stored on storage component 102. Processor component 104 of a system 100 can provide access to events of OES 110, e.g., as read(s) 108 that can be communicated to a reader. Generally, one processing instance, e.g., processor component 104, etc., is designated for writing events to a portion, e.g., segment, of OES 110. OES 110 can comprise one segment and/or parallel segments that can store events according to a key and ordered by an advancement of a progress value. In an aspect, more than one processing instance writing to a segment of an OES is typically disfavored because it can increase the difficulty of writing incoming events in an ordered manner. However, a given processing instance can read/write to more than one OES segment, e.g., a given processing instance can write to one or more OESs, to one or more segments of one OES, to one or more segments of one or more OESs, etc. As such, for a given number of segments there can typically be up to the same number of processing instances. Although adding more processing instances is allowable, these additional processing instances are generally idle in order to avoid scrambling an order of events being written to a segment. It is further noted that system 100 can comprise idle processing instances, for example as reserve processing instances for failover where an active processing instance becomes less responsive, etc. In an aspect, keys of one or more segments of an OES can represent a key space for OES 110. Segments can therefore act as logical containers associated with a particular range of keys for an event stream and can be used to store events within OES 110. When a new event is written to a stream, it can be stored to one of the segments based on the event key. In an aspect, events can be written as logically encapsulated in a transaction object. In another aspect, the key space can be divided into a number of ranges that can correspond to the number of segments of comprising OES 110. As an example, a key space for an OES can be from 0 to 100, the OES can comprise two parallel segments wherein the first segment sequentially stores events with, for example, keys from 0 to 30 and the second segment sequentially stores events with keys from >30 to 100. In this example, a first event with a key of 54 can be appended to the second segment, a second event with a key of 29 can be appended to the first segment, a third event with a key of 14 can be further appended to the second event in the first segment, etc.

OES 110, as illustrated in system 100, can be a simplistic example of an OES that can comprise just one segment for storing incoming event write(s) 106 and sourcing event read(s) 108, and therefore the key space of OES 110 can be embodied in the example single segment of events, e.g., the key space of OES 110 is not illustrated as being distributed across more than one parallel event storage segment. OES 110 can have an origin terminus 112. A first event can be written at origin terminus 112. The subsequent events and/or transactions can then be appended at an additive terminus 114 that is typically always at the head of the stream of written ordered events, e.g., a most recent event is written to the head of OES 110, which provides ordering of the events being written. This can result in OES 110 allowing for continuous and unbounded data storage that can be a durable, elastic, append-only, unbounded sequence of events. As an example, a $(K+1)^{th}$ event can be appended to the $K^{th}$ event of OES 110 at additive terminus 114. In an aspect, storage component 102 can store any number of OESs. Moreover, any one OES can comprise any number of parallel segments, e.g., stings of events for a defined key space range. Each segment can comprise an ordered sequence of stored events and/or transactions encapsulating a stored event.

In system 100, watermark component 120 can facilitate storing an indication of progress, e.g., as metadata, etc., for an event. In an aspect, the indication of progress can comprise a progress value, a reported progress value, an effective progress value, etc. In an aspect, progress can be based on nearly any measure of progress, such as a count of occurrences, a threshold value transition, a distance traversed, a current time, an elapsed time, rotations per minute (RPM), a piece count, etc. The indication of progress can be regarded as a watermark for an OES. In an aspect, the watermark can indicate a progress point, after which an event is typically not appropriate to be read. The watermark can be stored by system 100 as stream metadata, e.g., by processor component 104 via storage component 102, etc. In an aspect, watermark component 120 can be a discrete component, can be a virtualized component, etc., wherein a virtualized watermark component 120 can be performed by processor component 104, by one or more other processor unillustrated components, etc.

In an aspect, a transaction can encapsulate one or more events. These events can inherit a commitment state of the transaction. Accordingly, events of a transaction can be written and held in an uncommitted state until the transaction itself is committed. Where the transaction is discarded without commitment, the encapsulated events, even though written, can be ignored as uncommitted. The idea of a transaction is that a writer can "batch" up one or more event and commit it/them as a unit into a stream. The transactions, much like the events outside of a transaction, can be durable. In an aspect, events added to a transaction can be regarded as durable when an event is acknowledged back to the writer, even where the transaction is not yet committed, e.g., the event is stored but may not be acknowledged as readable until the transaction is committed. As such, events of a transaction can be treated as invisible to readers until the transaction is committed by the writer. An OES storage system according to the instant disclosure can track currently open transactions, e.g., uncommitted transactions. In an embodiment, a single event can be regarded as being encapsulated in a 'same size transaction,' e.g., the same size transaction can be committed contemporaneous with completing the writing of the encapsulated event. Similarly, a transaction encapsulating more than one event can be committed contemporaneous with completing the writing of the furthest progressed event of the encapsulated events. In some embodiments, a transaction encapsulating more than one event can be committed at a further progress point than the completing of the writing of the furthest progressed event of the encapsulated events, e.g., the transaction can be committed some period of time, some count of events, etc., after the last event of the transaction was fully written.

Introduction of a technique to watermark a stream can provide a progress bound via a stream writer to a stream reader that can enable the reader to identify where in the stream it is. Watermarking can enable a stream writer to provide progress information, e.g., when a writer reports some progress value, this can confirm that the writer has written event data up to that progress value. An OES system can aggregate progress information by finding a minimum of the most recently reported progress values across all writers of an OES stream, resulting in a watermark that can be stored as system data, such that when a reader reaches the progress value indicated by the watermark, the reader can have received all committed events from some start point and up to the progress value indicated by the watermark. In an aspect, progress is a general notion that indicates writers advance in populating a stream with events where, 1) progress cannot move backward, and 2) For any pair of progress values, e.g. p1 and p2, it is possible to perform a comparison, e.g., 'greater than,' 'less than,' 'equal to,' etc. As an example, p2 can be regarded as more recent than p1 when p2>p1.

Figure 2:
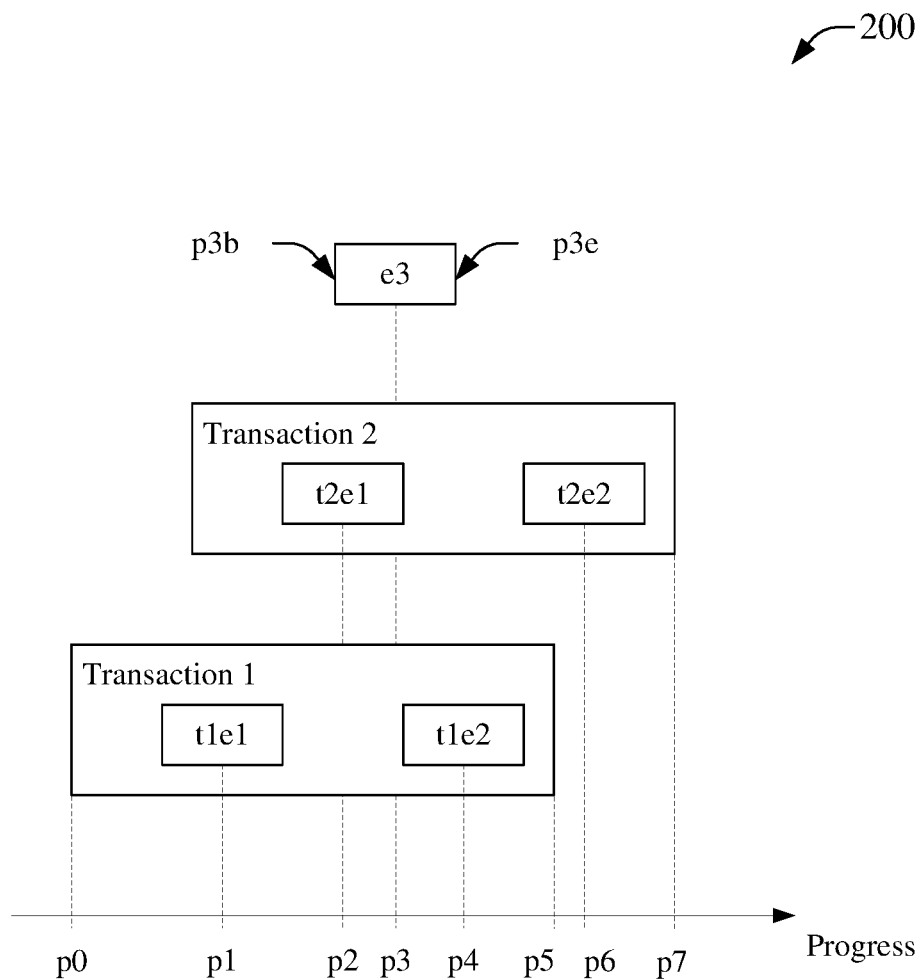
FIG. 2 is an illustration of example system enabling watermarking based on OES event object storage progress for an ordered event stream, in accordance with aspects of the subject disclosure.

FIG. 2 is an illustration of an example system enabling watermarking based on OES event object storage progress for an ordered event stream, in accordance with aspects of the subject disclosure. System 200 can comprise a storage component, not illustrated, that can be the same as, or similar to storage component 102, storing an OES, not illustrated, that can be the same as, or similar to OES 110, that can store the illustrated events and transactions. System 200 can store OES events, e.g., OES event e3, t1e1, t2e2, etc. In an aspect, the OES events can be encapsulated in a transaction, e.g., OES events t1e1 and t1e2 can be encapsulated in Transaction 1. In some embodiments, events, for example OES event e3, can be treated as being encapsulated in a transaction that can open and close in the same progress window as the event itself, e.g., the event and the transaction can be of the same 'size.'

In system 200, OES events can be stored in an ordered manner relating to a progress metric, e.g., p0, p1, . . . , p6, p7, etc. As an example, p0 can correspond to the opening of Transaction 1, p1 can correspond to writing event t1e1 of Transaction 1, p3 can correspond to writing event e3, etc. In an aspect, finer grain progress can also be employed in indicating the progress of event writing, e.g., p3b can correspond to beginning the writing of event e3 while p3e can correspond to completion of the writing of event e3, etc. Accordingly, progress values can indicate what has been written into system 200. In an aspect, the progress values can also indicate when an event has been committed to an OES of system 200. As an example, progress value p3e can indicate that event e3 has been committed to an OES. Similarly, for example, p6 can indicate that Transaction 2 has been committed to the example OES.

In example system 200, event t2e1 can be understood to have been created within Transaction 2 between the two events created for Transaction 1, e.g., p2 occurs between p1 and p4. The writes of Transaction 1 and Transaction 2 can report progress, for example at corresponding commit times, e.g., Transaction 1 can report committing at p5, e.g., events t1e1 and t1e2 can be committed when their encapsulating transactions become committed, then Transaction 2 can report committing at p7. However, this can result in event t2e1 going into the stream, e.g., being available to be read from the stream, after Transaction 1 indicates progress to p5 because Transaction 2 is not committed until p7. In an aspect, if a watermark is based only on a progress marker, then this can result in a watermark corresponding to p5 indicating that t1e1 and t1e2 can be in the stream, e.g., events up to p5 can be read. However, event t2e1 occurs at p2 and therefore, should be readable because p2 is lower than p5, e.g., p2<p5, but event t2e1 is not committed and could be properly disregarded as Transaction 2 is not committed. This can lead to reduced confidence that appropriate events in an OES stream are being returned. As is illustrated hereinafter, a bare progress metric as illustrated in system 200 can be improved upon to restore confidence that the proper events are readable.

In an aspect, another progress metric can be employed, e.g., a 'reported progress' metric. In system 200, at creation of Transaction 1, a last reported progress can be p0. Progress p0 can be stored is stored as metadata of Transaction 1, e.g., indicating opening, or an initial progress, of Transaction 1. A writer can populate the transaction with an arbitrary number of events, two events, t1e1 and t1e2, in this example. However, the writer reporting progress for the transaction's events, e.g., at p1 and p4, can be understood to be associated with a commit state of Transaction 1, e.g., if Transaction 1 is not committed at p5, then the events of Transaction 1 should typically not be available to be read from the stream. As such, while raw progress metrics ignore this conditional nature of writing events in a transaction, a reported progress metric can be determined that does consider the uncommitted state of an encapsulating transaction, e.g., the uncommitted state of Transaction 1 from p0 to p5. Additionally, a writer can create events without a wrapping transaction, or with a same-size transaction wrapper, e.g., event e3. In example system 200, a reported progress of p0 can be indicated at progress p0. Further, reported progress can remain at p0 while progress advances to p1. Moreover, reported progress can remain at p0 while progress advances to p2. At p3, reported progress can be updated to p3 because event e3 has been committed to an OES. Reported progress can then remain at p3 while progress advances to p4. At the committing of Transaction 1, reported progress can advance to p5 as progress advances to p5. This illustrates that reported progress can lag raw progress. However, use of reported progress as a watermark allows it to be observed that there is a mismatch in the ordering, e.g., the writer may report progress p3 after event e1 has been created at p1 and committed at p5. This is an improvement over raw progress metrics that can result in reading of events that are written but not committed due to their encapsulation in an open transaction. In short, committed events can be read despite uncommitted events/transactions remaining hidden until eventual committal to a stream.

Figure 3:
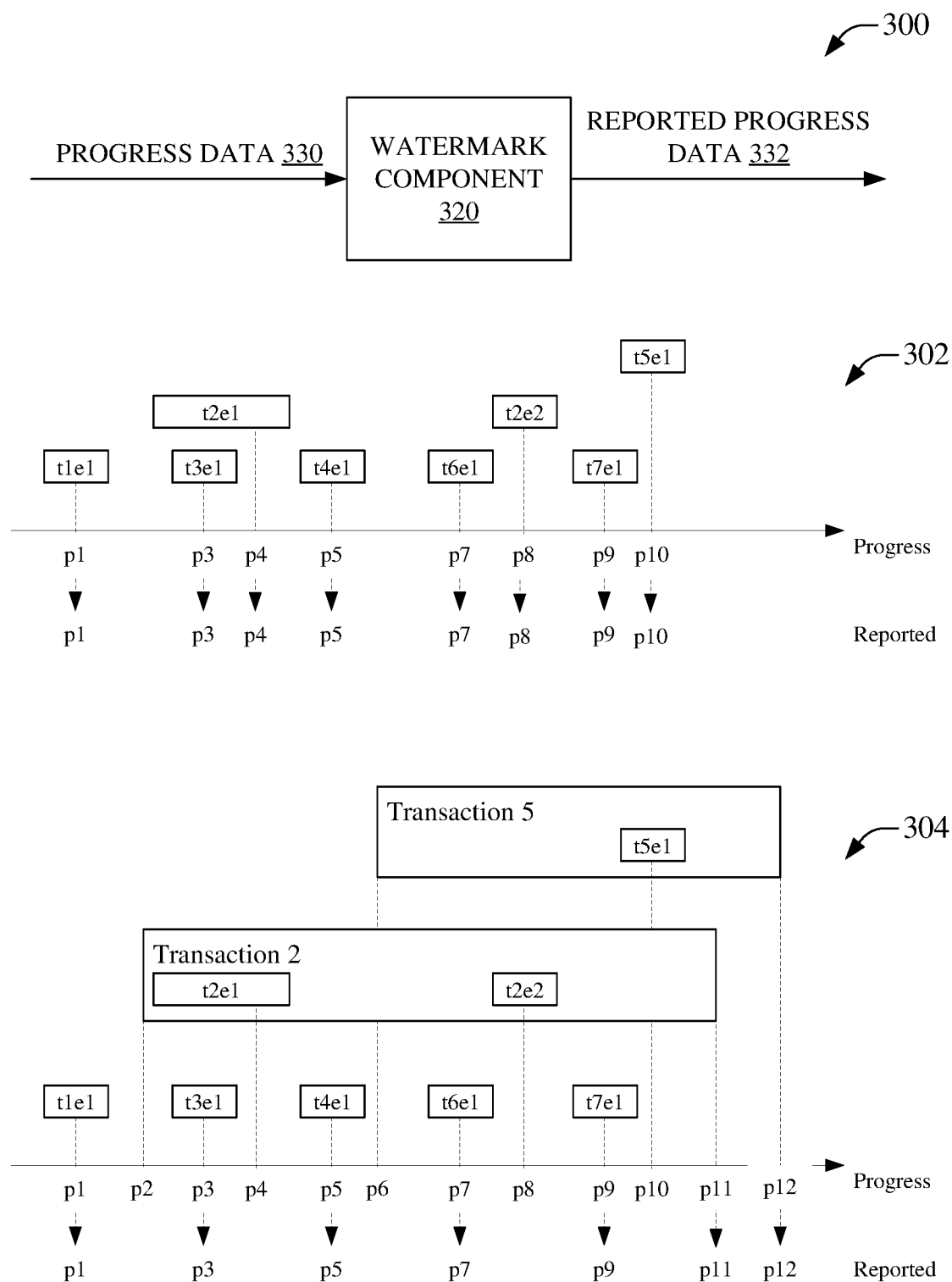
FIG. 3 illustrates an example system that can facilitate access to a reported progress value based on a commitment state of an OES event object, in accordance with aspects of the subject disclosure.

FIG. 3 is an illustration of a system 300, which can facilitate access to a reported progress value based on a commitment state of an OES event object, in accordance with aspects of the subject disclosure. System 300 can comprise watermark component 320 that can receive progress data 330 and can return reported progress data 332. At 302, progress data for the illustrated events, e.g., t1e1, t3e1, t2e1, t5e1, t7e1, etc., can be reported by writers and can be comprised in progress data 330. Also at 302, it can be seen that reported progress can mirror progress, e.g., reported progress data 332 can comprise similar or same information as is comprised in progress data 330, where the events do not experience delay in being committed, for example where they are not comprised in transactions.

However, at 304, some events can be comprised in transactions. This can impact what events are readable where a watermark is based on either the progress or reported progress metric. Writing of t2e1 and t2e2 occurs at the same progress point in both 302 and 304, however, in 304 these events inherit the commit state of Transaction 2 and are not committed until p11. As such, in 304 reported progress can be based on committed events in contrast to progress values that indicate an event has been written and is ignorant of a commit state that can be altered by, for example, encapsulation in a transaction. As can be seen in 302 and 304, reported progress is updated only where an event and/or transaction becomes committed, though there are no committal delays in 302. As such, in 302 reported progress mirrors raw progress values. However in 304, reported progress lags raw progress, as examples, at progress p2, reported progress is still p1, at progress p8, reported progress is p7, etc. In 304, this can allow for reading of committed events outside of a transaction that extends committal of an encapsulated event, which can be an improvement over the use of raw progress metrics that could lead to the reading of uncommitted events. However, this also can result in confusion over reading encapsulated events, e.g., reported progress does not indicate if t2e1 at progress p4 should be readable at p5, p7, or p9, although it should become readable at p11 where Transaction 2 is committed. To resolve this conflict an effective progress metric can be determined as is disclosed herein below.

Figure 4:
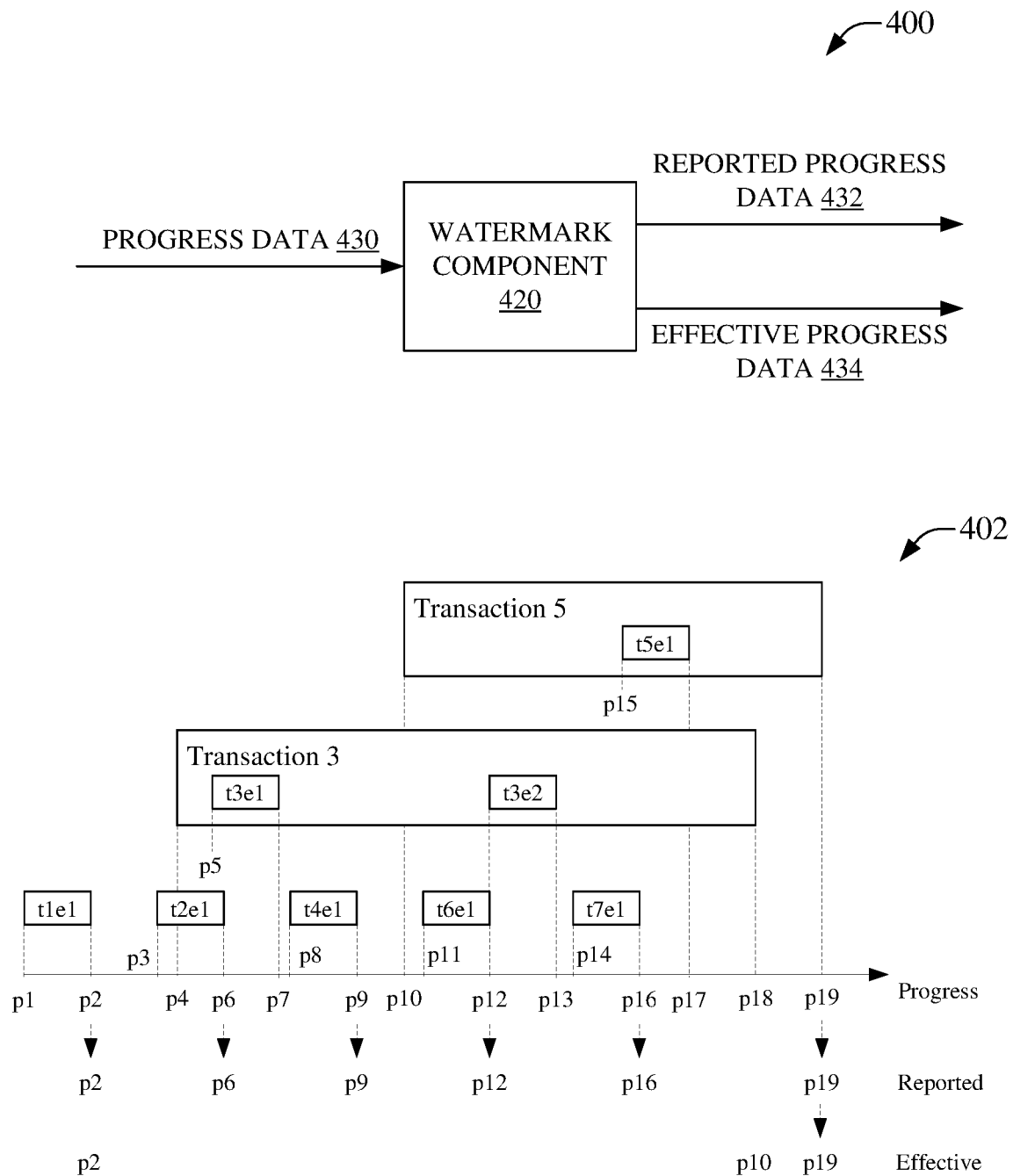
FIG. 4 is an illustration of an example system that can enable access to an effective progress value based on a commitment state of an OES transaction object, in accordance with aspects of the subject disclosure.

FIG. 4 is an illustration of a system 400 that can enable access to an effective progress value based on a commitment state of an OES transaction object, in accordance with aspects of the subject disclosure. System 400 can comprise watermark component 420 that can receive progress data 430 and can return reported progress data 432 and/or effective progress data 434. At 402, progress data for the illustrated events, e.g., t1e1, t3e1, t2e1, t5e1, t7e1, etc., can be reported by writers and can be comprised in progress data 430. Also at 402, it can be seen that reported progress can lag raw progress, e.g., reported progress can indicate that committed events can be readable although earlier progress but as of yet uncommitted events can get read while uncommitted or can get ignored until committed which can result in reading less than all of the events up to a watermark. As an example, at progress p9, reported progress is also p9 where event t4e1 is committed, however event t3e1 of Transaction 3 can have been written but can remain uncommitted due to the open commitment state of Transaction 3 at p9. As such, if t3e1 is read as part of a reader advancing to a watermark of p9, and Transaction 3 is later voided and not committed, then t3e1 has been read out in error. Also, if t3e1 is not read as part of a reader advancing to a watermark of p9, and Transaction 3 is later committed, then the reader failed to read out a (later) committed event that it should have read out where p7<p9.

Effective progress values can be determined that can resolve this problem of reported progress. Effective progress can be determined by taking into account open transactions. Advancing of effective progress values can be retarded to avoid advancing beyond an initial progress of any currently open event/transaction. As an example, event t1e1 can be written between p1 and p2 and therefore can be considered in an uncommitted state, e.g., an open event. In an aspect, event t1e1 can alternatively be viewed as an event encapsulated in a same-size transaction wrapper such that the transaction encapsulating event t1e1 opens at p1 and commits at p2. As such, committing t1e1 to the stream can result in reported progress being advanced to p2. Moreover, where p2 also coincides with the closing of on the open event/transaction t1e1, the effective progress can similarly be advanced to p2. Accordingly, a watermark can be based on effective progress p2, such that a reader can read events of the stream up to p2 and, in an improvement over reported progress data 432, there can be confidence that no uncommitted event was read and also that no later committed event was not read.

Continuing discussion of system 402, at p3 event t2e1 can be opened, at p4 Transaction 3 can be opened, and at p5 event t3e1 of Transaction 3 can be opened. As such, if raw progress p5 were to be employed as a watermark, a read might read t1e1 properly and then improperly read parts of t2e1, which, at p5 has not even yet been completely written and/or committed. Clearly, use of raw progress can be problematic. However, at p5, the use of reported progress, still indicating p2, can allow for proper reading of t1e1 and properly not reading anything between p2 and p5, e.g., the problems with use of reported progress have not blossomed at p5. Similarly, the use of effective progress as the watermark at p5, e.g., still also showing advancement to p2, would have similar effect to the reported progress.

Further continuing discussion of system 402, at p6 event t2e1 can be committed, which can result in updating reported progress to p6. It is noted that effective progress is not advanced to p6 because event t3e1 at p5 and Transaction 3 at p4 remain open, e.g., uncommitted, at p6. Accordingly, if raw progress p6 were to be employed as a watermark, t1e1 and t2e1 can both be read properly, but t3e1 which is open and not committed at p6 can also be improperly read where it is later not committed or can be improperly not read where it is later committed. Again, use of raw progress can be problematic for similar reasons to reported progress, e.g., partial reading up to p6 of an incomplete and/or uncommitted event, namely t3e1 where p5<p6. Where effective progress is employed to determine the watermark at p6, e.g., effective progress remains at p2, only reading of event t1e1 is permitted and, although t2e1 is committed, this is not read out because it occurs in a progress window that has open events/transactions, e.g., p2-p6 comprises an open transaction, Transaction 3 at p4, and comprises an open event, t3e1 at p5.

Again continuing discussion of system 402, at p7 event t3e1 can be completed, but the event can inherit the commitment status of Transaction 3 and can therefore be written but not yet committed. At p8, event t4e1 can be opened and, at p9 can be committed, which can result in updating reported progress to p9. At p10 Transaction 5 can be opened. At p11, event t6e1 can be opened. At p12, event t6e1 can be committed, which can result in reported progress being advanced to p12, and event t3e2 can contemporaneously be opened. At p13, writing of event t3e2 can be completed, but due to Transaction 3 not yet being committed, t2e2 can remain uncommitted even though written, which can result in not advancing reported progress. At p14, event t6e1 can be opened. At p15, event t5e1 can be opened. At p16, event t7e1 can be committed, which can result in updating reported progress to p16. At p17, writing of event t5e1 can be completed, but due to Transaction 5 not yet being committed, t5e1 can remain uncommitted even though written, which can result in not advancing reported progress. Moreover, effective progress remains at p2, even where reported progress has advanced to p16 and raw progress has advanced to p17, due to the remaining noncommittal status of events/transactions such as Transaction 3 at p4, etc. Accordingly, use of effective progress metrics for determining a watermark can result in reading of only event t1e1 even where raw progress has advanced to p17. As above, use of reported progress or raw progress for a watermark can result in erroneous reading of, or failure to properly read, events that have been written but have not been committed by p17, e.g., t3e1, t3e2, t5e1, etc.

Returning again to discussion of system 402, at p18, Transaction 3 can become committed, which can result in contemporaneous committal of previously written events t3e1 and t3e2 according to their corresponding write completion progress, e.g., p7 and p13 correspondingly, e.g., p7 can be an effective committal at p18 of event t3e1 and p13 can be an effective committal at p18 of event t3e2. At p18, reported progress remains at p16 because effective committal of t3e2 via committal of Transaction 3 is indicated as having occurred at p13 which is lower than p16. Also at p18, effective progress can be advanced to p10 because Transaction 5 remains uncommitted from point p10. As such, at raw progress is at p18, reported progress is p16 and effective progress is p10. Raw and reported progress will continue to suffer with erroneous reading of, or failure to properly read, events that have been written but have not been committed as is noted hereinabove, e.g., if p18 is used as the watermark, t5e1 can be read where it is as of yet unknown if it will be committed or not. If p16 is used as the watermark, t5e1 may not be read, even though it should be where it later becomes committed. As such, using effective progress value p10 results in confidence that all events read are proper to be read because they have been committed, and that no event with an uncertain future committal has been read. However, despite this confidence, use of effective progress for watermarking results in events that have been committed between p10 and p18 but are not read, e.g., t6e1, t3e2, t7e1, etc.

Yet again returning to discussion of system 402, at p19, Transaction 5 can become committed, which can result in contemporaneous committal of previously written event t5e1 according to the corresponding write completion, e.g., effective committal of t5e1 is p17 at/after p19. At p19, reported progress can be updated to p17 because committal of t5e1 via committal of Transaction 5 is indicated as having occurred at p17. Also at p19, effective progress can be advanced to p19 because Transaction 5, and all other events/transactions, are committed though point p19. As such, at raw progress is at p19, reported progress is p17 and effective progress is p19. At this point, all example events/transactions are committed and each of raw, reported, or effective progress will properly read out the illustrated events properly and with confidence.

As is discussed in relation to at least system 400, the use of effective progress provides confidence that read events are proper to be read, e.g., events that will never be committed are not being improperly read and events that will become committed at a later point are not being omitted. This is in contrast to using raw progress that can result in reading of events that are eventually aborted. It is also in contrast to using reported progress that can read some events that will never be committed and can fail to read some events that will become committed at a later point.

In an aspect, use of effective progress in determining a watermark can result in being prevented from reading otherwise properly committed events beyond the effective progress. Accordingly, reported progress data 432 can be employed to determine committed events between the effective progress point and the raw progress point. These events can therefore be read out with the caveat that there may be additional events that between the effective progress point and the raw progress point that are not read out because they have not yet been committed. As such, in example system 402, at raw progress p18, effective progress is at p10 and reported progress is at p16. In this example, a watermark based on effective progress, e.g., via effective progress data 434, can provide confidence that reading events up to p10 does not miss any events and also does not include improper events. Moreover, in this example, reported progress p16, via reported progress data 432, can be employed to read out event t6e1, t3e2, and t7e1, with the caveat that another event can be omitted that can later become committed, e.g., the caveat can indicate that there can be missing but otherwise proper events. As an example, though not illustrated in example 402 for clarity, an event in Transaction 5 occurring around p11-12 would not have been committed by p18 and, as such, would not be readable according to a watermark based on effective progress of p10, but could be read based on reported progress data then at p16.

Figure 5:
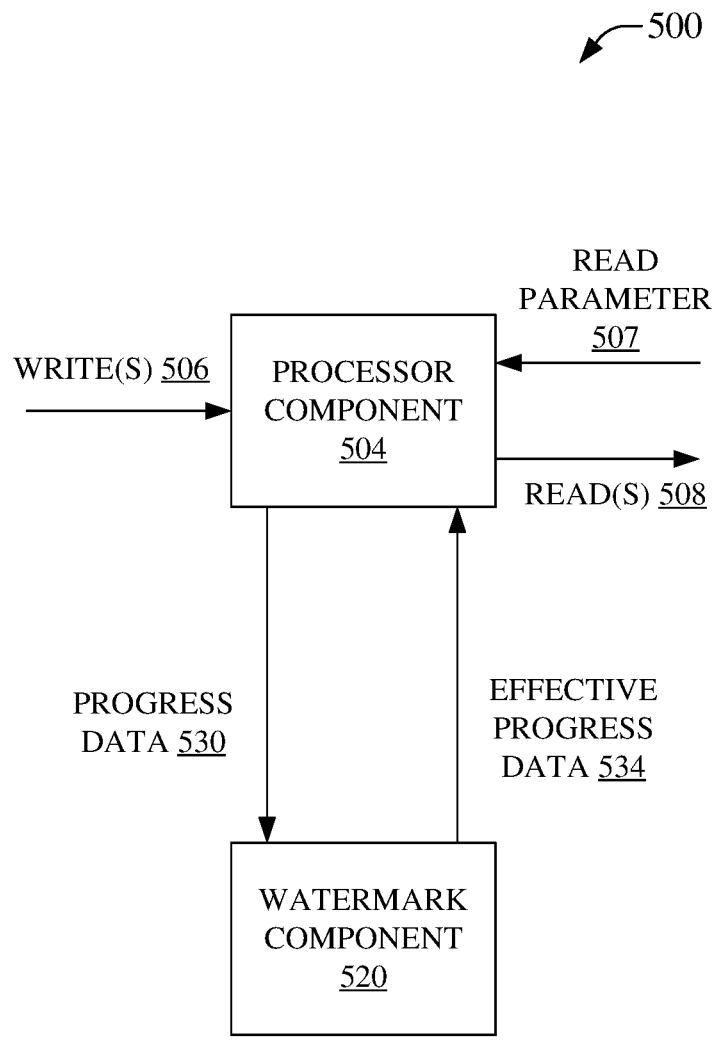
FIG. 5 is an illustration of an example system that can facilitate reading an OES event object based on a read parameter and OES watermarking based on a commitment state of an OES transaction object, in accordance with aspects of the subject disclosure.

FIG. 5 is an illustration of a system 500, which can facilitate reading an OES event object based on a read parameter and OES watermarking based on a commitment state of an OES transaction object, in accordance with aspects of the subject disclosure. System 500 can comprise processor component 504, which can receive write(s) 506 that can be written to an OES, e.g., OES 110, etc., for storage, e.g., via storage component 102, etc. Processor component 504 can provide access to events stored in an OES, e.g., events can be read, e.g., as read(s) 508, etc.

In an aspect, a scope of a read, e.g., event data read via read(s) 508, etc., can be based on selected, designated, determined, etc., parameters, e.g., customer defined event read scope, which can be indicated via read parameter 507, etc. As such, reading an event(s) between a first and second progress value can be indicated via read parameter 507, which can result in returning corresponding events via read(s) 508. Using events stored in system 400 as an example, read parameter 507 can indicate readers should return all events between p3 and p7. In this example, employing a watermark based on effective progress data 534, no events will be returned. Why these parameters return no events can be understood by comparing raw progress values and effective progress values.

As is disclosed herein, effective progress can lag raw progress, and can also lag reported progress which itself can also lag raw progress. In system 402, at raw progress p7, effective progress is at p2 because at p3 event t2e1 is opened (which is committed at p6) and during the uncommitted pendency of t2e1, both Transaction 3 and event t3e1 are opened and remain uncommitted at p7. As such, effective progress is not advanced past p2. Where effective progress remains at p2, a read from p3 to p7 based on a watermark derived from the effective progress, comprises no events, e.g., the watermark based on a p2 effective progress does not read any events written past p2 and, where p2<p3, there are no permitted event reads despite event t2e1 being written and committed between p3 and p6. However, if the watermark is based on reported progress, event t2e1, which is committed at p6, can be returned via read(s) 508. Moreover, where the watermark is based on raw progress, event t3e1 can also be returned even though it can later be either aborted or committed. As such, use of effective progress in determining a watermark can provide greater confidence that only events that are properly committed will be returned, although some properly committed events can be omitted due to their being committed during an uncommitted pendency of another event/transaction.

In an aspect, progress of write(s) 506 can be accessed by watermark component 520, e.g., as progress data 530, for example via processor component 504. Progress data 530 can comprise raw progress values that can enable watermark component 520 to track raw progress and commitment states of events and/or transactions of an OES. As such, watermark component 520 can determine raw progress, reported progress, and/or effective progress, which progresses can be employed in determining a watermark for the writes of the OES that can enable reading events with varying levels of confidence that read event(s) are properly committed and/or all relevant event(s) have been returned. Watermarks based on effective progress can have the greatest confidence that read events include all properly committed events and only properly committed events, e.g., no events that are later aborted and no events at points of progress that can have events latter committed therein. Watermarks based on reported progress can provide a lesser level of confidence in that only committed events can be reported, but that some later committed events having an effective commitment progress value can have been omitted from the reading, in the above example, event t3e1 would not be returned for a watermark based on reported progress at p7, although it is later committed at p18 with an effective commitment of p7, and therefore was erroneously omitted from reads up to p7 where the reads are performed prior to p18. Similarly, a watermark based on raw progress can result in further decreased confidence that proper events are being returned, e.g., these read events can comprise uncommitted events that can later be aborted and therefore should not have been part of the OES at all.

Watermark component 520, in an aspect, can return effective progress information as effective progress data 534, e.g., effective progress data 534 can comprise an effective progress value. In an aspect, watermark component 520 can determine a watermark based on effective progress information and can enable access to this watermark via effective progress data 534, e.g., effective progress data 534 can comprise a watermark based on an effective progress value. In some aspects, watermark component 520 can enable access to raw progress data 530, a watermark based on a raw progress value, reported progress data, a watermark based on a reported progress value, etc., although not illustrated in system 500 for the sake of clarity and brevity.

Figure 6:
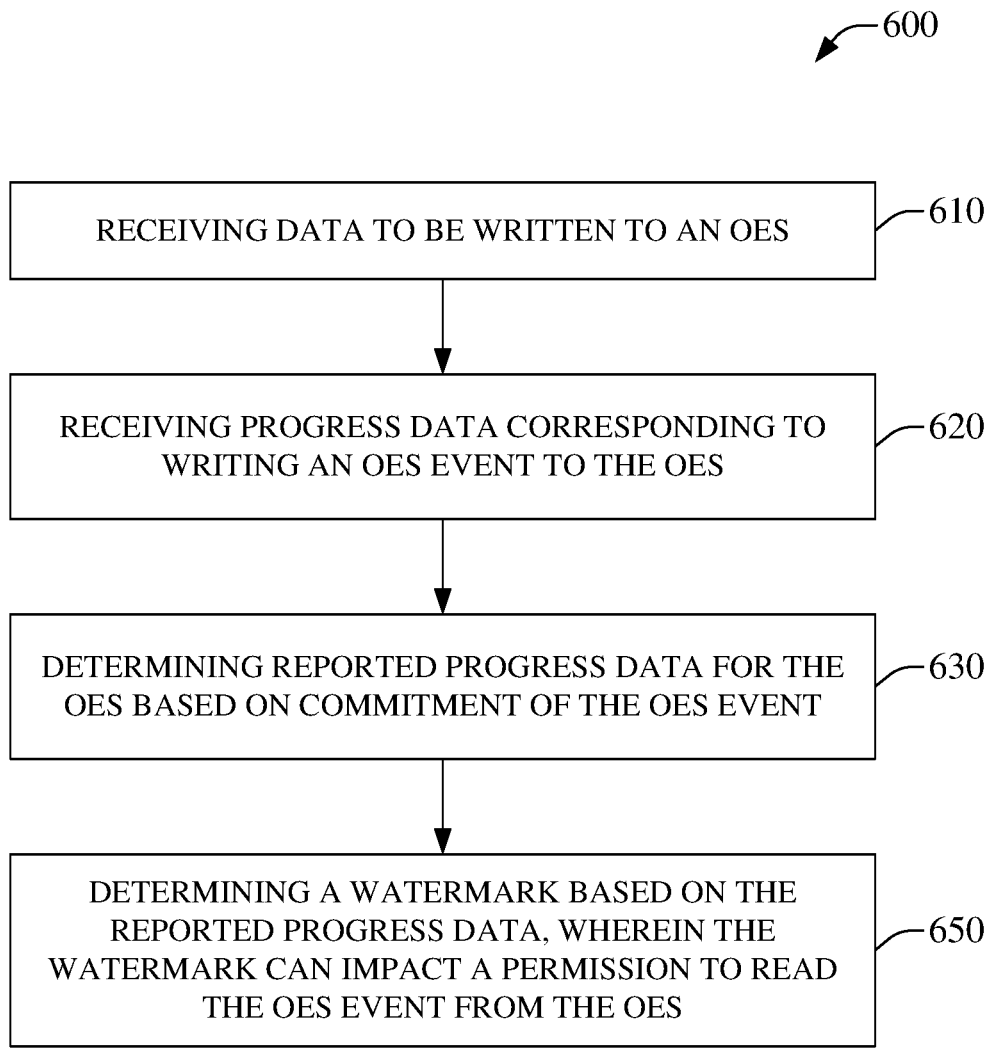
FIG. 6 is an illustration of an example method enabling access to a reported progress value based on a commitment state of an OES event object, in accordance with aspects of the subject disclosure.
Figure 7:
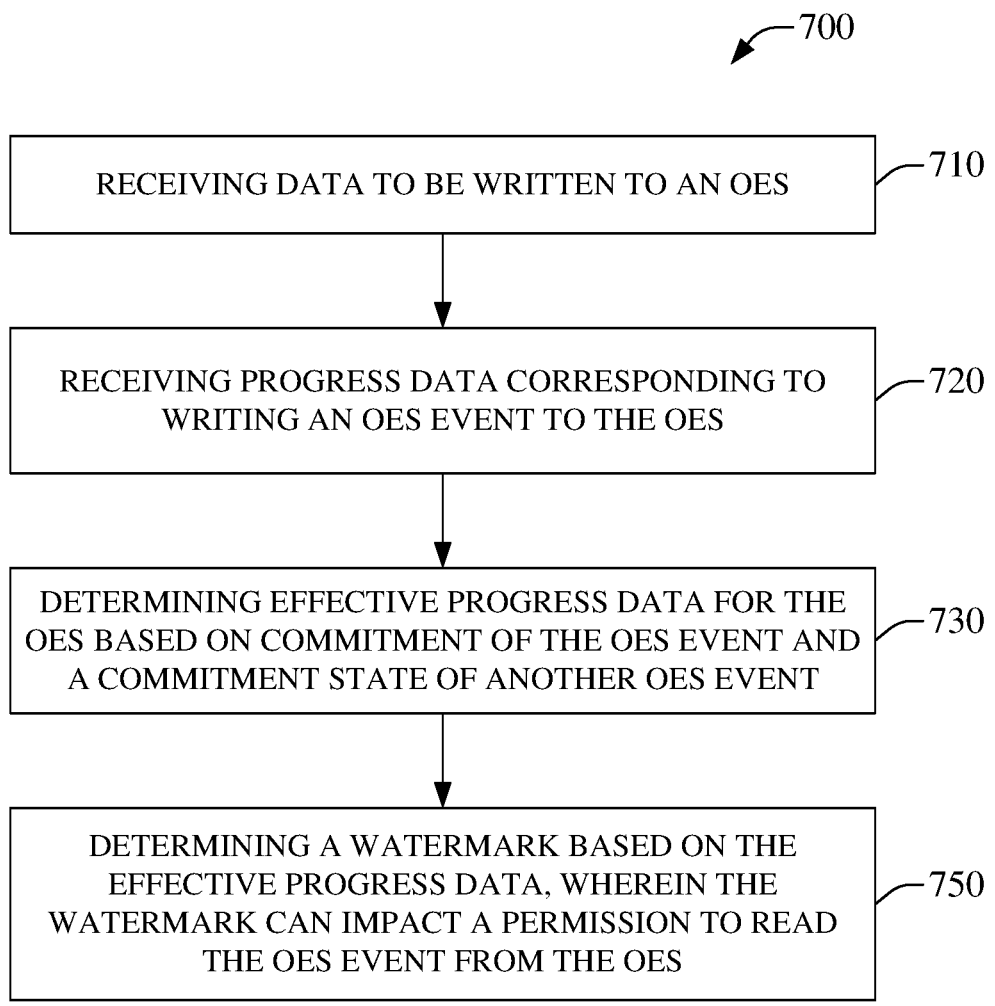
FIG. 7 is an illustration of an example method facilitating access to an effective progress value based on a commitment state of an OES event object, in accordance with aspects of the subject disclosure.
Figure 8:
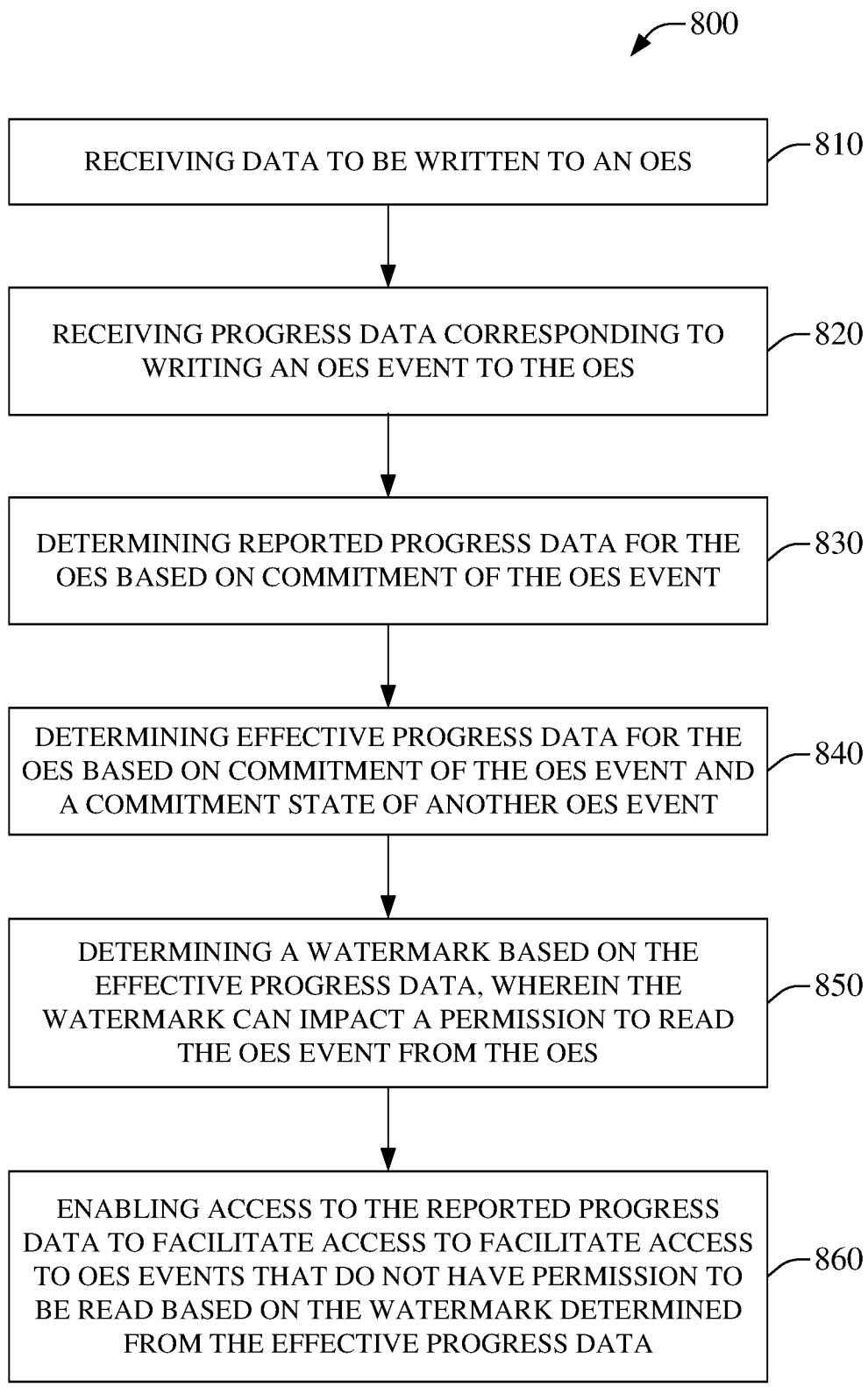
FIG. 8 is an illustration of an example method facilitating access to an effective progress value based on a first commitment state of an OES event object and to a reported progress value based on a second commitment state of an OES event object, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternately be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600, which can facilitate access to a reported progress value based on a commitment state of an OES event object, in accordance with aspects of the subject disclosure. At 610, method 600 can comprise receiving data to be written to an OES. The received data can be written to the OES as an OES event object, e.g., herein typically indicated by the term event, OES event, OES event object, etc. The OES event can be written to an OES via a writer, e.g., via write(s) 106, 506, etc., that can be performed by a processor, e.g., processor component 104, 504, etc., of an OES system, e.g., 100, 200, 300, 400, 500, etc.

At 620, progress data can be received by method 600. Progress data can be raw progress data as disclosed elsewhere herein and can correspond to writing of an OES event to the OES. As an example, writing a K+1$^{th}$ event to additive terminus 114 can be associated with advancing progress of OES 110 and corresponding progress data can be indicated accordingly, e.g., writing event e3 in system 200 can advance progress from p2 to p3, etc. In an aspect, the progress data can comprise an indication of writing an event to an OES, committing an event to an OES, opening writing of an event to an OES, completing writing of an event to an OES, opening a transaction object, herein typically referred to as a transaction, in an OES, closing a transaction object in an OES, committing a transaction object in an OES, an effective commitment progress point of an event encapsulated in a transaction object of an OES, etc.

Method 600, at 630, can comprise determining reported progress data for the OES based on commitment of the OES event. Reported progress data can be based on progress data received at 620. Reported progress data can further be based on commitment of the OES event in the OES. In an aspect, an event is encapsulated in a transaction object of the OES, the commitment of that event can be an effective commitment at a progress point prior to commitment of the encapsulating transaction object. As such, reported progress can lag raw progress and can have a value reflecting a progress point corresponding to committed OES event objects. As an example, in system 304, event t3e1 can be committed at p5 and reported progress can be advanced from progress point p3 to p5 in response to that commitment even though reported progress was not advanced from p3 to p4 based on the writing of event t2e1 due to that event being encapsulated in uncommitted Transaction 2. This can be contrasted with advancing reported progress, in system 302, from progress point p3 to p4 then to p5 in response to commitment of t2e1 (not encapsulated in an uncommitted transaction object) and then committing event t4e1. As is disclosed, reported progress can be the same as, or similar to, raw progress where there is not delay in committing, or possible aborting of, an event object in the OES. However, reported progress can differ from raw progress in that it can lag raw progress when there can be a delay in committing, or possible aborting of, an event object in the OES. In an aspect, use of reported progress can result in failure to read an event object that is, at a later progress point, committed to an OES, e.g., via an effective commitment that is 'back-dated' to a point of progress corresponding to the reported progress based read event.

At 640, method 600 can comprise determining a watermark based on the reported progress data, wherein the watermark can impact a permission to read the OES event from the OES. At this point method 600 can end. A watermark can be employed by readers to read events not exceeding the reported progress point. In an OES that can have a delay in committing, or possible aborting of, an event object in the OES, reliance on a reported progress based watermark can allow reading of properly committed events. However, reliance on a reported progress based watermark in an OES that can have a delay in committing, or possible aborting of, an event object in the OES can also result in omitting reading of events that are later properly committed event after the delay and are associated with an effective commitment at a progress point less than the reported progress employed in determining said watermark. As such, basing the watermark on another progress indicator, e.g., an effective progress, can provide greater confidence that all properly committed events are permitted to be read, albeit at the cost of not permitting reading of properly committed events between the effective progress and the reported progress values.

FIG. 7 is an illustration of an example method 700, which can facilitate access to an effective progress value based on a commitment state of an OES event object, in accordance with aspects of the subject disclosure. At 710, method 700 can comprise receiving data to be written to an OES. The received data can be written to the OES as an OES event object. The OES event can be written to an OES via a writer that can be performed by a processor of an OES system.

At 720, progress data can be received by method 700. Progress data can be raw progress data as disclosed elsewhere herein and can correspond to writing of an OES event to the OES. In an aspect, the progress data can comprise an indication of writing an event to an OES, committing an event to an OES, opening writing of an event to an OES, completing writing of an event to an OES, opening a transaction object, herein typically referred to as a transaction, in an OES, closing a transaction object in an OES, committing a transaction object in an OES, an effective commitment progress point of an event encapsulated in a transaction object of an OES, etc.

At 730, method 700 can comprise determining effective progress data for the OES based on commitment of the OES event and a commitment state of another event, e.g., an effective commitment of an event encapsulated in a transaction object, etc. Effective progress data can be based on progress data received at 720. Effective progress data can further be based on commitment of the OES event and the commitment state of the other event in the OES. As an example, in system 402, event t2e1 can be committed at p6 and event t3e1 can have an effective commitment (at p18) of p7. As such, in this example, effective progress can be at p2 even though a reported progress can be at p6 for raw progress of p7, e.g., even though event t2e1 is committed at p6, this commitment occurs after Transaction 3 is opened at p4 and remains uncommitted at p7, as such, effective progress reflects only advancement to committed event t1e1 at p2. Effective progress can indicate a progress point after which some event/transaction is uncommitted. As such, reading events up to the effective progress value can ensure that all committed events up to that point are readable but that other properly committed events that occur at progress points with uncommitted events are not readable, e.g., omitting events with pending effective commitments and events committed in parallel with the pending effective commitments.

At 740, method 700 can comprise determining a watermark based on the effective progress data, wherein the watermark can impact a permission to read the OES event from the OES. At this point method 700 can end. A watermark can be employed by readers to read events not exceeding the effective progress point. In an OES that can have a delay in committing, or possible aborting of, an event object in the OES, reliance on an effective progress based watermark can allow reading of only properly committed events that are not committed while other events are pending commitment. However, reliance on an effective progress based watermark in an OES that can have a delay in committing, or possible aborting of, an event object in the OES can also result in omitting reading of events that are later properly committed, e.g., have an effective commitment progress value. As such, basing the watermark on an effective progress indicator, e.g., an effective progress, can provide greater confidence that all properly committed events are permitted to be read, albeit with more lag than employing reported progress or raw progress based watermark. However, reported progress, and/or raw progress, can be employed in addition to an effective progress based watermark to access some OES events at high confidence of completeness, and other OES events at a lower level of confidence.

FIG. 8 is an illustration of an example method 800, which can enable access to an effective progress value based on a first commitment state of an OES event object and to a reported progress value based on a second commitment state of an OES event object, in accordance with aspects of the subject disclosure. At 810, method 800 can comprise receiving data to be written to an OES. The received data can be written to the OES as an OES event object. The OES event can be written to an OES via a writer that can be performed by a processor of an OES system.

At 820, progress data can be received by method 800. Progress data can be raw progress data as disclosed elsewhere herein and can correspond to writing of an OES event to the OES. In an aspect, the progress data can comprise an indication of writing an event to an OES, committing an event to an OES, opening writing of an event to an OES, completing writing of an event to an OES, opening a transaction object, herein typically referred to as a transaction, in an OES, closing a transaction object in an OES, committing a transaction object in an OES, an effective commitment progress point of an event encapsulated in a transaction object of an OES, etc.

Method 800, at 830, can comprise determining reported progress data for the OES based on commitment of the OES event. Reported progress data can be based on progress data received at 820. Reported progress data can further be based on commitment of the OES event in the OES. As such, reported progress can lag raw progress and can have a value reflecting a progress point corresponding to a last committed OES event object. Reported progress can differ from raw progress in that it can lag raw progress when there can be a delay in committing, or possible aborting of, the other event object in the OES. As is indicated elsewhere herein, use of reported progress can result in failure to read an event object that is, at a later progress point, committed to an OES, e.g., via an effective commitment.

At 840, method 800 can comprise determining effective progress data for the OES based on commitment of the OES event and a commitment state of the other event, e.g., an effective commitment of an event encapsulated in a transaction object, etc. Effective progress data can be based on progress data received at 820. Effective progress data can further be based on commitment of the OES event and the commitment state of the other event in the OES. Effective progress can indicate a progress point after which some event/transaction is uncommitted. As such, reading events up to the effective progress value can ensure that all committed events up to that point are readable but that other properly committed events that occur at progress points with uncommitted events are not readable, e.g., omitting events with pending effective commitments and events committed in parallel with the pending effective commitments.

At 850, method 800 can comprise determining a watermark based on the effective progress data, wherein the watermark can impact a permission to read the OES event from the OES. A watermark can be employed by readers to read events not exceeding the effective progress point. In an OES that can have a delay in committing, or possible aborting of, an event object in the OES, reliance on an effective progress based watermark can allow reading of only properly committed events that are not committed while other events are pending commitment. However, reliance on an effective progress based watermark in an OES that can have a delay in committing, or possible aborting of, an event object in the OES can also result in omitting reading of events that are later properly committed, e.g., have an effective commitment progress value. As such, basing the watermark on an effective progress indicator, e.g., an effective progress, can provide greater confidence that all properly committed events are permitted to be read, albeit with more lag than employing reported progress or raw progress based watermark. However, reported progress, and/or raw progress, can be employed in addition to an effective progress based watermark to access some OES events at high confidence of completeness, and other OES events at a lower level of confidence.

At 860, method 800 can comprise enabling access to the reported progress data determined at 830. At this point method 800 can end. The reported progress data determined at 830 can facilitate access to OES events that do not have permission to be read based on the watermark determined at 850. While events read according to a reported progress value can be prone to omission of events subject to delayed commitment to the OES, the reported progress level events can have less lag from a current raw progress value than those readable under the effective progress determined watermark. Accordingly, method 800 can enable access to some events with high confidence in completeness but that can have a higher lag from a raw progress value, and access to other events with less lag and a lower level of confidence.

Figure 9:
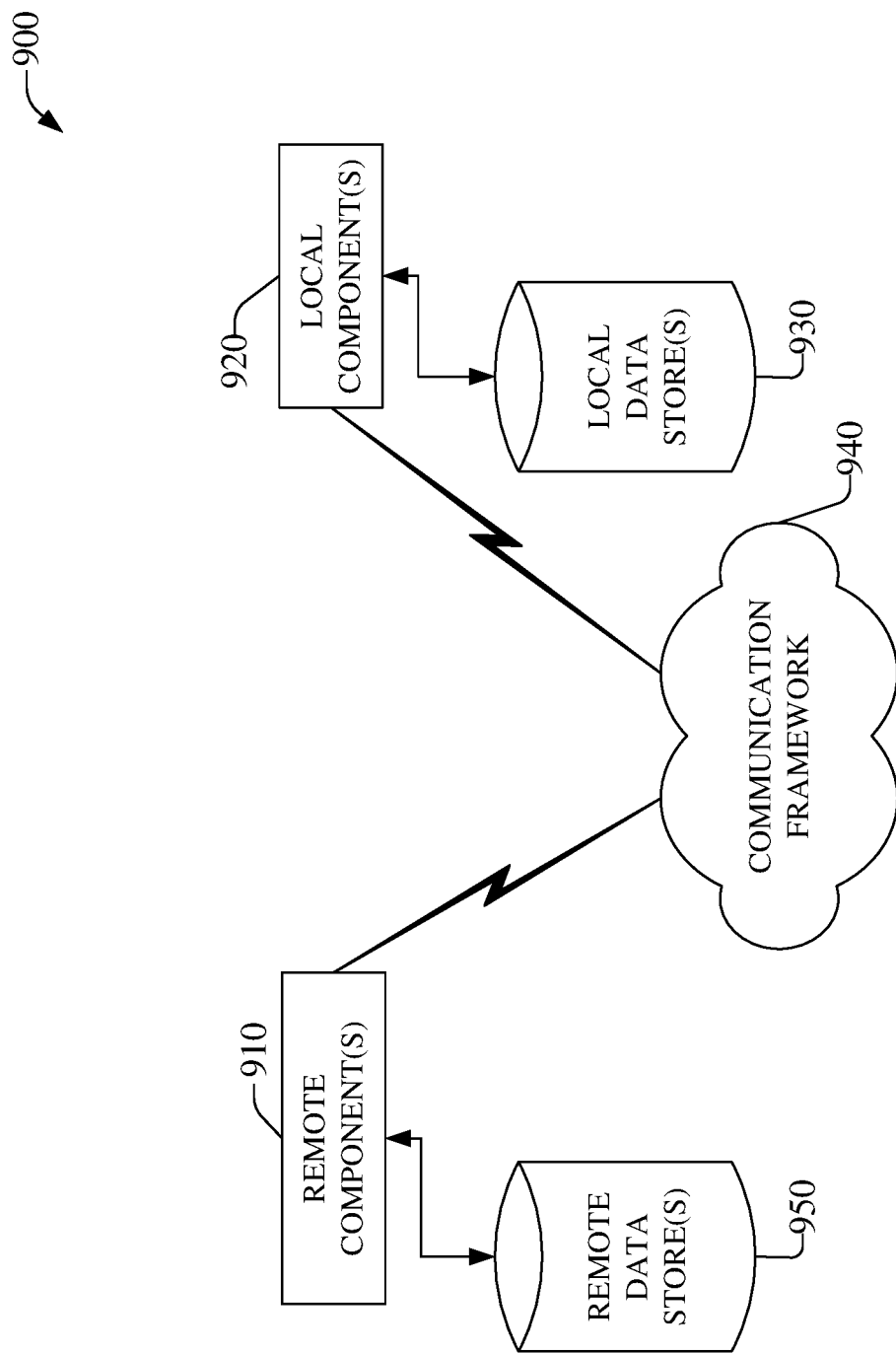
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located device comprised in storage component 102, a remotely located processor device comprised in processor component 104, 504, etc., a remotely located device comprised in watermark component 120, 320, 420, 520, etc., connected to a local component via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local device comprised in storage component 102, a processor device comprised in processor component 104, 504, etc., a device comprised in watermark component 120, 320, 420, 520, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, progress data 330, 430, 530, etc., reported progress data 332, 432, etc., write(s) 106, read(s) 108, effective progress data 434, 534, etc., read parameter 507, etc., or other information can be communicated via communication framework 940 among components of an OES storage network 100, 200, 300, 400, 500, etc., e.g., to facilitate determining a watermark that can alter permissions related to reading events form an OES, as disclosed herein.

Figure 10:
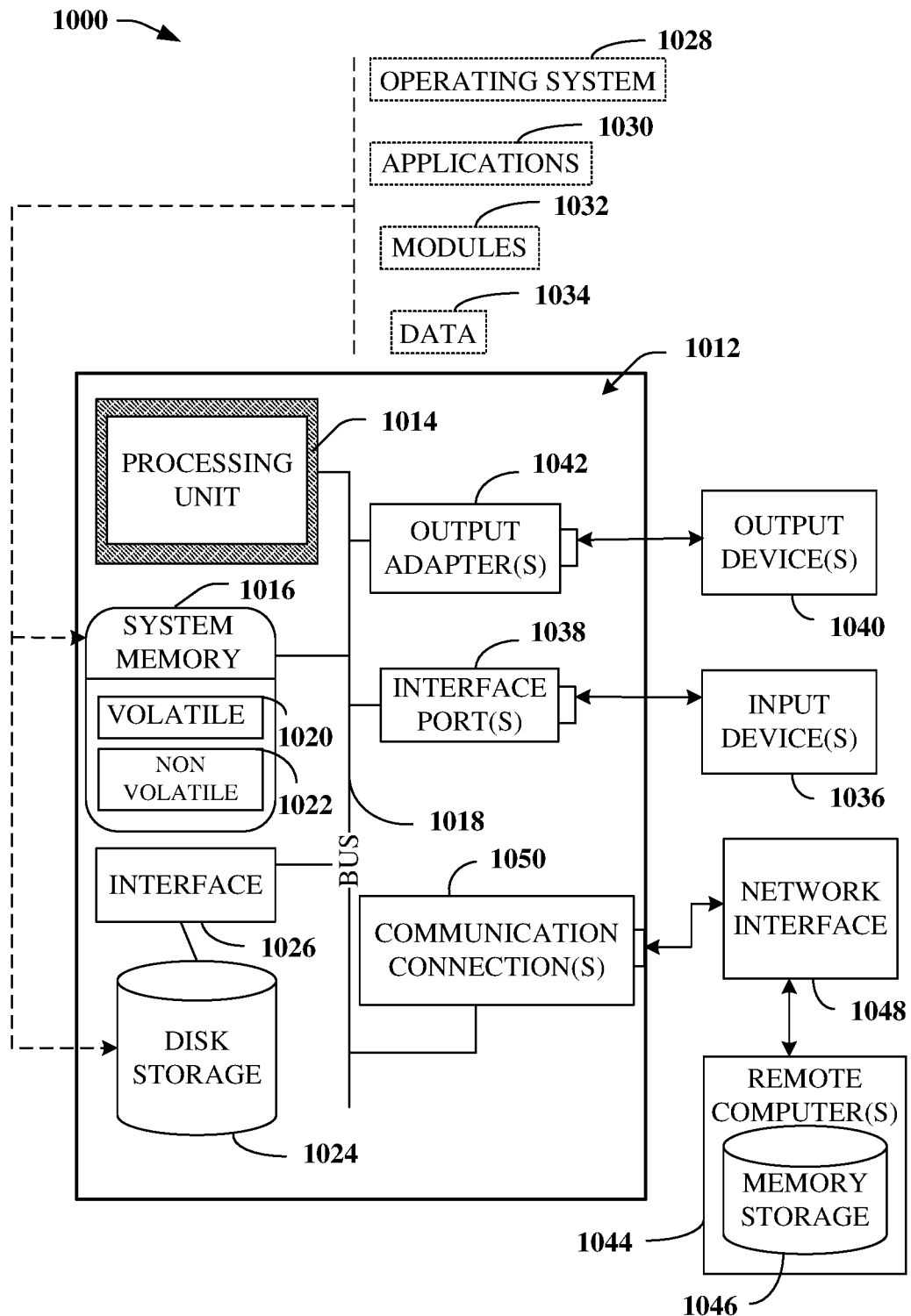
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in any of storage component 102, processor component 104, 504, etc., watermark component 120, 320, 420, 520, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations comprising receiving a raw progress value determined in response to a first event being written to an ordered event stream, determining an effective progress value based on a deferred commitment of a second event, and altering a permission related to reading of a portion of events from the ordered event stream based on a watermark determined from the effective progress value.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength (λ) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
  a processor; and
  a memory that stores executable instructions that, when executed by the processor, facilitate performance of operations, comprising:
    receiving raw progress data for an event write operation corresponding to an advancement of an event population of an ordered event stream of an ordered event stream storage system;
    determining effective progress data for the event write operation based on the raw progress data and a commitment state of a first event of the ordered event stream, wherein the commitment state is inherited from a transaction object;
    determining a watermark for the ordered event stream based on the effective progress data for the event write operation; and
    setting a first permission to read a second event of the ordered event stream based on the watermark.

2. The system of claim 1, wherein the first event of the ordered event stream is a different event than the second event of the ordered event stream.

3. The system of claim 1, wherein the first event of the ordered event stream is a same event as the second event of the ordered event stream.

4. The system of claim 1, wherein the raw progress data indicates a first progress of the advancement of the event population of the ordered event stream, wherein the effective progress data indicates a second progress of the advancement of the event population of the ordered event stream, and wherein the first progress lags the second progress according to a third progress of the advancement of the event population of the ordered event stream corresponding to the commitment state of the first event of the ordered event stream.

5. The system of claim 1, wherein the raw progress data indicates a first progress of the advancement of the event population of the ordered event stream, wherein the effective progress data indicates a second progress of the advancement of the event population of the ordered event stream, and wherein the first progress is same as the second progress according to a third progress of the advancement of the event population of the ordered event stream corresponding to the commitment state of the first event of the ordered event stream.

6. The system of claim 1, wherein the transaction object corresponds to storage of the first event of the ordered event stream.

7. The system of claim 6, wherein the transaction object corresponds to storage of the first event of the ordered event stream and a second event of the ordered event stream.

8. The system of claim 1, wherein the raw progress data corresponds to a time-based advancement of the event population of the ordered event stream.

9. The system of claim 1, wherein the raw progress data corresponds to a count-based advancement of the event population of the ordered event stream.

10. The system of claim 1, wherein the raw progress data corresponds to a distance-based advancement of the event population of the ordered event stream.

11. The system of claim 1, wherein the operations further comprise, in response to determining reported progress data based on the raw progress data and commitment of a third event of the ordered event stream wherein the third event of the ordered stream is not permitted to be read according to the first permission, setting a second permission to read the third event of the ordered stream.

12. The system of claim 11, wherein the raw progress data indicates a first progress of the advancement of the event population of the ordered event stream, wherein the reported progress data indicates a second progress of the advancement of the event population of the ordered event stream, wherein the effective progress data indicates a third progress of the advancement of the event population of the ordered event stream, and wherein the third progress lags the second progress that lags the first progress according to a fourth progress of the advancement of the event population of the ordered event stream corresponding to the commitment state of the first event of the ordered event stream.

13. The system of claim 11, wherein the raw progress data indicates a first progress of the advancement of the event population of the ordered event stream, wherein the reported progress data indicates a second progress of the advancement of the event population of the ordered event stream, wherein the effective progress data indicates a third progress of the advancement of the event population of the ordered event stream, and wherein the third progress, the second progress, and the first progress are the same progress according to a fourth progress of the advancement of the event population of the ordered event stream corresponding to the commitment state of the first event of the ordered event stream.

14. A method, comprising:
  writing, by a system comprising a processor, a first event to an ordered event stream of an ordered event stream storage system, wherein the writing of the event advances a progression of the event population of the ordered event stream, and wherein the progression corresponds to a raw progress value of raw progress values corresponding to event write operations;
  determining, by the system, an effective progress value corresponding to an event write operation of the event write operations based on a deferred commitment of a second event to the ordered event stream, wherein the deferred commitment state is inherited from a transaction object;
  determining, by the system, a watermark for the ordered event stream based on the effective progress value corresponding to the event write operation; and
  enabling, by the system, reading of a portion of events from the ordered event stream based on the watermark.

15. The method of claim 14, wherein the enabling the reading of the portion of events from the ordered event stream based on the watermark permits reading of the events up to the effective progress value.

16. The method of claim 15, wherein the effective progress value is less than the raw progress value.

17. The method of claim 14, wherein the progression of the event population of the ordered event stream is selected from a group of progressions comprising a time-based progression, a count-based progression, and a distance-based progression.

18. A non-transitory machine-readable medium, comprising executable instructions that, when executed by a processor, facilitate performance of operations, comprising:
  receiving a raw progress value corresponding to an event write operation, wherein the raw progress value was determined in response to a first event being written to an ordered event stream of an ordered event stream storage system, wherein the first event being written advanced a progression of the event population of the ordered event stream, and wherein the raw progress value corresponds the progression of the event population at the writing of the first event;
  determining an effective progress value corresponding to the event write operation based on a deferred commitment of a second event to the ordered event stream, wherein the deferred commitment state is inherited from a transaction object;
  indicating a watermark for the ordered event stream based on the effective progress value; and
  altering a permission related to reading of a portion of events from the ordered event stream based on the watermark.

19. The non-transitory machine-readable medium of claim 18, wherein the operations further comprise:
  in response to the altering the permission not enabling reading a second portion of events from the ordered event stream, determining a reported progress value based on a commitment of a third event to the ordered event stream; and
  enabling reading of the second portion of the events from the ordered event stream based on the reported progress value.

20. The non-transitory machine-readable medium of claim 19, wherein the progression of the event population of the ordered event stream is measured according to a progression type selected from a group of progression types comprising a time progression type, a count progression type, and a distance progression type.

* * * * *